(12) United States Patent
Uchibori et al.

(10) Patent No.: US 12,337,955 B2
(45) Date of Patent: Jun. 24, 2025

(54) PROPELLER GUARD

(71) Applicant: NIPPON TELEGRAPH AND TELEPHONE CORPORATION, Tokyo (JP)

(72) Inventors: Daisuke Uchibori, Tokyo (JP); Yujin Hamano, Tokyo (JP); Kazuaki Watanabe, Tokyo (JP); Masafumi Nakagawa, Tokyo (JP); Atsushi Aratake, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/028,754

(22) PCT Filed: Sep. 30, 2020

(86) PCT No.: PCT/JP2020/037379
§ 371 (c)(1),
(2) Date: Mar. 28, 2023

(87) PCT Pub. No.: WO2022/070376
PCT Pub. Date: Apr. 7, 2022

(65) Prior Publication Data
US 2023/0331378 A1 Oct. 19, 2023

(51) Int. Cl.
*B64C 27/00* (2006.01)
*B64U 30/26* (2023.01)
*F16B 5/06* (2006.01)

(52) U.S. Cl.
CPC ............ *B64C 27/006* (2013.01); *B64U 30/26* (2023.01); *F16B 5/06* (2013.01)

(58) Field of Classification Search
CPC .... B64U 30/26; B64U 30/299; B64C 27/006; B64C 27/20
See application file for complete search history.

(56) References Cited

U.S. PATENT DOCUMENTS

| 10,988,241 B2* | 4/2021 | Santangelo ............ B64U 10/14 |
| 11,021,240 B2* | 6/2021 | Lee ......................... B64U 10/10 |
| 2018/0134378 A1* | 5/2018 | Oberndorfer ......... B64C 27/006 |
| 2021/0114730 A1* | 4/2021 | MacDonald .......... B64C 39/024 |
| 2022/0097865 A1* | 3/2022 | Sidoti ...................... A63H 27/12 |
| 2023/0060888 A1* | 3/2023 | Yan .......................... B64C 1/00 |

FOREIGN PATENT DOCUMENTS

| CN | 107539466 A | 1/2018 |
| CN | 111284692 A * | 6/2020 ............ B64C 39/02 |
| WO | 2015049798 A1 | 4/2015 |

OTHER PUBLICATIONS

Yato et al. (2018) "Development of Unmanned Aerial Vehicle Technology Enabling Inspection in Sewer Pipes and Other Confined Space" The 29th Non-Cutting Technology Research Presentation, Nov. 14, 2018.
Kanehira et al. (2019) "Development of a Drone Bridge Inspection System, MARCO™" Kawada Technical Report, vol. 38.

* cited by examiner

*Primary Examiner* — Philip J Bonzell
*Assistant Examiner* — Anna L. Gordon

(57) ABSTRACT

A propeller guard 10 includes an upper frame 12 provided on the uppermost surface of the propeller guard 10, a base frame 15 provided on the lowermost surface of the propeller guard, and a curved frame 18 that couples the upper frame 12 and the base frame 15 together and is curved outward.

12 Claims, 6 Drawing Sheets

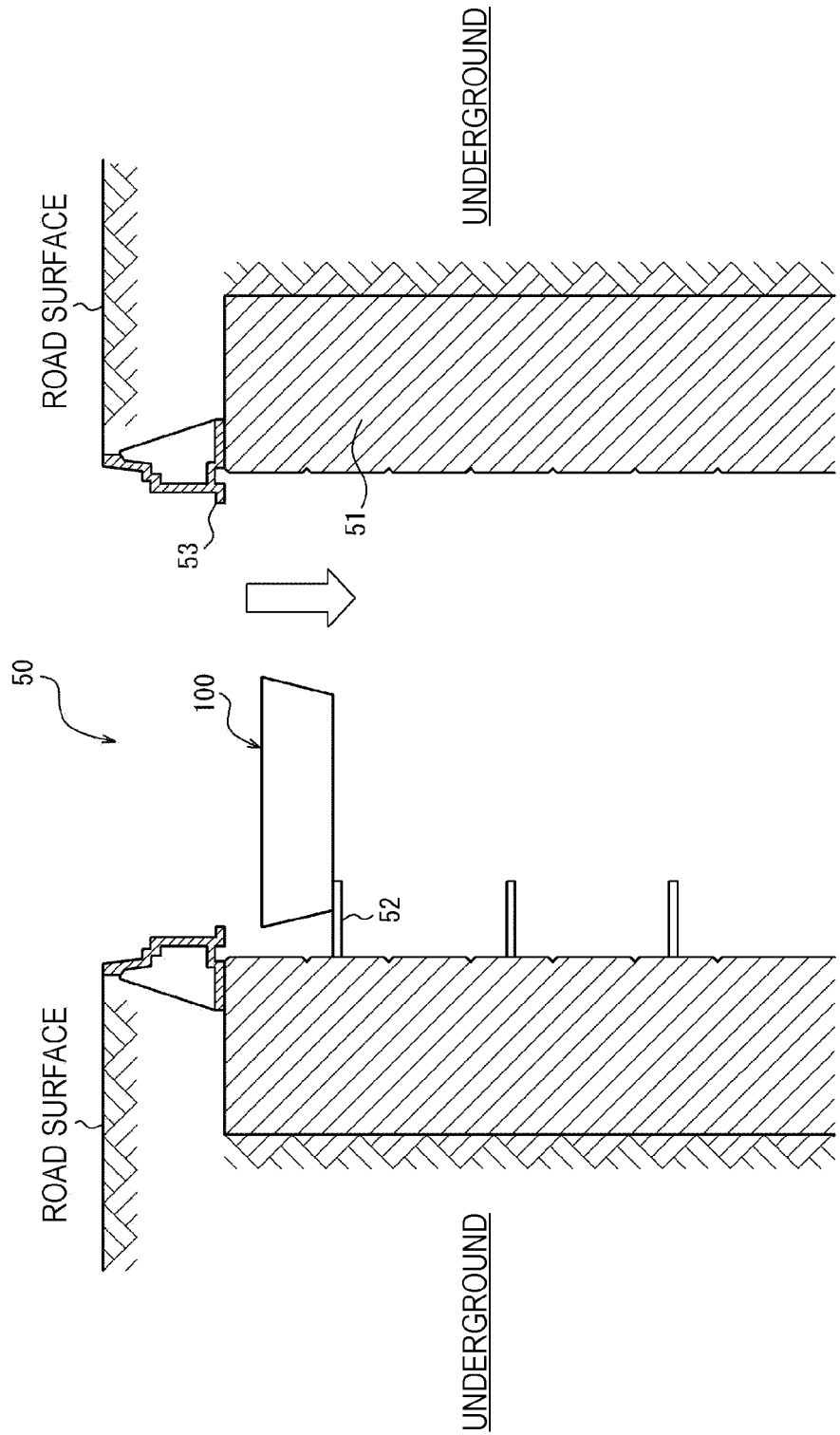

PROPELLER GUARD

CROSS-REFERENCE TO RELATED APPLICATIONS

This application is a U.S. National Stage Application filed under 35 U.S.C. § 371claiming priority to International Patent Application No. PCT/JP2020/037379, filed on 30 Sep. 2020, the disclosure of which is hereby incorporated herein by reference in its entirety.

TECHNICAL FIELD

The present disclosure relates to a propeller guard that protects a propeller of a flight vehicle.

BACKGROUND ART

In recent years, a flight vehicle (for example, a drone, a multicopter, or the like) that flies by rotation of a plurality of propellers may be used for inspection of an infrastructure structure.

In Non Patent Literature 1, a method is disclosed of using a flight vehicle for inspection of pipeline facilities buried in the ground. When the flight vehicle flies in such a space surrounded by a wall surface, if the airframe collides with an object such as the wall surface, the propeller may be damaged and the airframe may crash. Thus, a propeller guard that protects the propeller may be attached to the airframe.

In Non Patent Literature 2, a propeller guard is devised for protecting a propeller when a flight vehicle collides with an object and preventing the flight vehicle from losing a flight balance and becoming uncontrollable even when the flight vehicle collides with the object.

CITATION LIST

Non Patent Literature

Non Patent Literature 1: Yoshihiko Yato et al., "Development of drone capable of coping with closed space such as sewer pipeline", 29th Trenchless Technology Conference, 2.1, 2018

Non Patent Literature 2: Noriyuki Kanehira et al., "Development of a Drone Bridge Inspection System", Kawada Technical Report, vol. 38, 2019

SUMMARY OF INVENTION

Technical Problem

However, when the flight vehicle moves in the vertical direction in a space surrounded by a wall surface, in the propeller guard devised in Non Patent Literature 2, there is a possibility that the guard frame comes into contact with a protrusion and the flight vehicle cannot move, and there is a possibility that the flight vehicle loses its balance and falls.

FIG. 4 is a cross-sectional view of a manhole 50. As illustrated in FIG. 4, in the manhole 50, when a manhole lid installed on the ground is opened and closed, a columnar or quadrangular prism structure 51 (for example, reinforced concrete pipe) extends in the vertical direction in the ground, and a step 52 for a worker to go down to the underground or to go up to the ground is installed in the middle.

FIGS. 5A and 5B are diagrams illustrating a problem when a flight vehicle 100 with a propeller guard moves in a space surrounded by a wall surface, such as the manhole 50. As illustrated in FIG. 5A, when the flight vehicle 100 to which the propeller guard is attached is caused to ascend in the structure 51, the propeller guard is caught on protruding objects such as the step 52 and a manhole lid receiving frame 53, and the flight vehicle 100 cannot ascend in some cases. In addition, as illustrated in FIG. 5B, when the flight vehicle descends, the propeller guard is similarly caught by the protruding objects such as the step 52 and the manhole lid receiving frame 53, and the movement is hindered in some cases.

An object of the present disclosure made in view of such circumstances is to provide a propeller guard capable of suppressing a stop of flight when a flight vehicle collides with an object.

Solution to Problem

A propeller guard according to an embodiment is a propeller guard attached to a flight vehicle including a propeller and protecting the propeller, the propeller guard including: a first frame provided on an uppermost surface of the propeller guard; a second frame provided on a lowermost surface of the propeller guard; and a curved frame that couples the first frame and the second frame together and is curved outward.

Advantageous Effects of Invention

According to the present disclosure, it is possible to provide a propeller guard capable of suppressing a stop of flight when a flight vehicle collides with an object.

BRIEF DESCRIPTION OF DRAWINGS

FIG. 5B is a diagram illustrating a problem of the flight vehicle including the conventional propeller guard.

DESCRIPTION OF EMBODIMENTS

Hereinafter, an embodiment will be described in detail with reference to the drawings. Note that the drawings are only schematically illustrated to the extent that the present invention can be sufficiently understood. Thus, the present invention is not limited only to the illustrated examples. In addition, for convenience of illustration, scales in the respective drawings may be different from actual scales or may not match between the drawings.

Figure 1:
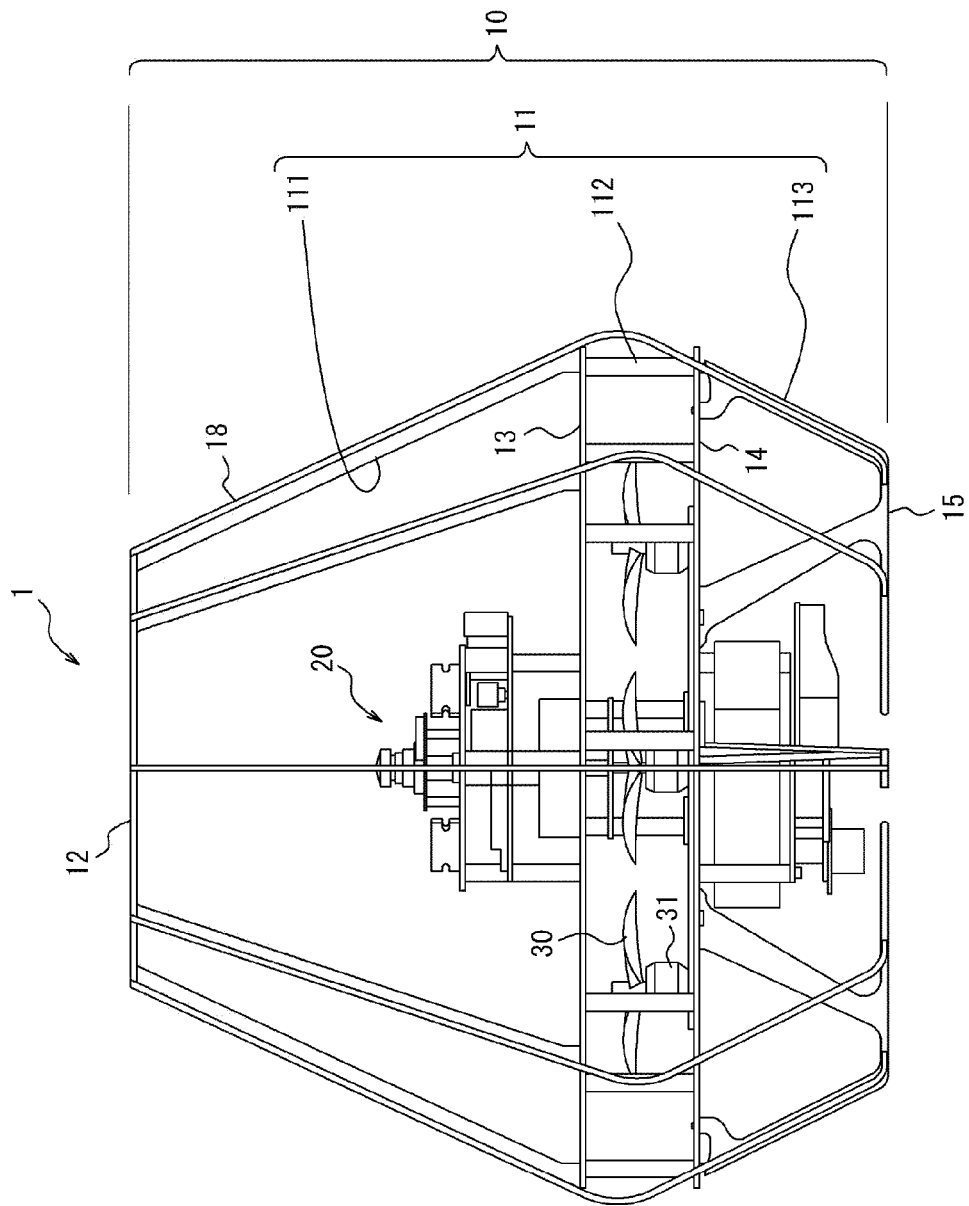
FIG. 1 is an example of a side view of a flight vehicle including a propeller guard according to an embodiment.

FIG. 1 is a diagram illustrating an example of a configuration of a flight vehicle 1 including a propeller guard 10 according to an embodiment of the present disclosure (Hereinafter, simply referred to as a "flight vehicle" 1.), and is a side view of the flight vehicle 1. The flight vehicle 1 illustrated in FIG. 1 includes the propeller guard 10, a flight vehicle body 20, and one or more propellers 30. The flight vehicle 1 flies by one or more propellers each including a rotation axis in the vertical direction.

The propeller guard 10 is configured to surround the propellers 30 in a state of being attached to the flight vehicle 1, and protects the propellers 30. The propeller guard 10 may be configured to surround not only the propellers 30 but also the entire flight vehicle body 20 as illustrated in FIG. 1. The propeller guard 10 may be configured to surround a part of the flight vehicle body 20.

In the example illustrated in FIG. 1, the propeller guard 10 includes a coupling frame 11, an upper frame 12, an intermediate frame 13, a lower frame 14, a base frame 15, and a curved frame 18. The numbers of the coupling frames 11, the intermediate frames 13, and the curved frames 18 each are not limited to one, and can be arbitrarily determined. The numbers of the coupling frames 11, the intermediate frames 13, and the curved frames 18 each affect the strength of the propeller guard 10. Thus, for example, in a case where it is assumed that the flight vehicle 1 is moved at a high speed, the number of the coupling frames 11, the number of the intermediate frames 13, and the number of the curved frames 18 may be increased to increase the strength of the propeller guard 10.

The upper frame 12 as a first frame is a frame provided on the uppermost surface of the propeller guard 10. The upper frame 12 is provided in parallel to a rotating surface (in FIG. 1, a surface extending in the left-right direction of the figure) of the propeller 30.

The intermediate frame 13 is a frame provided below the upper frame 12 in substantially parallel to the upper frame 12. That is, the intermediate frame 13 is provided along the rotating surface of the propeller 30. The intermediate frame 13 can be provided at any height between the upper frame 12 and the lower frame 14.

The lower frame 14 is a frame provided below the intermediate frame 13 in substantially parallel to the upper frame 12. That is, the lower frame 14 is provided in parallel to the rotating surface of the propeller 30. A motor 31 for the propeller 30 is mounted on the lower frame 14.

In a case where a trajectory (locus) of a rotating end of the propeller 30 is projected on the upper frame 12, the intermediate frame 13, and the lower frame 14, the trajectory is contained inside a zone formed by outer edges of the upper frame 12, the intermediate frame 13, and the lower frame 14. Thus, the upper frame 12, the intermediate frame 13, and the lower frame 14 surround the propeller 30 and protect the propeller 30 from colliding with an object or the like.

The base frame 15 as a second frame is a frame provided on the lowermost surface of the propeller guard 10. The base frame 15 is installed below the lower frame 14 (at the lowermost surface of the propeller guard 10) in substantially parallel to the upper frame 12, and is a frame in contact with an object such as the ground at the time of landing of the flight vehicle 1. The base frame 15 provides stability at the time of landing of the flight vehicle 1 and protects the bottom of the flight vehicle 1. Center points of the upper frame 12, the intermediate frame 13, the lower frame 14, and the base frame 15 are desirably located on a center axis of the flight vehicle body 20 to balance the flight vehicle during flight.

The coupling frame 11 is a frame that couples the upper frame 12, the intermediate frame 13, the lower frame 14, and the base frame 15 together. The coupling frame 11 includes a first coupling portion 111 that couples the upper frame 12 and the intermediate frame 13 together, a second coupling portion 112 that couples the intermediate frame 13 and the lower frame 14 together, and a third coupling portion 113 that couples the lower frame 14 and the base frame 15 together. Note that, in the present embodiment, an example is described in which the intermediate frame 13 is provided between the upper frame 12 and the lower frame 14, but the present invention is not limited thereto. The propeller guard 10 may have a configuration in which the upper frame 12 and the lower frame 14 are coupled together by the coupling frame 11 without being provided with the intermediate frame 13.

The curved frame 18 is a frame provided outside the coupling frame 11 and having a structure (shape) curved outward in the horizontal direction (direction in which the flight vehicle body 20 does not exist as viewed from the propeller guard 10). The curved frame 18 couples the upper frame 12 as the first frame and the base frame 15 as the second frame together. Note that, although FIG. 1 illustrates an example in which the curved frame 18 includes one member that couples the upper frame 12 and the base frame 15 together, the present invention is not limited thereto. The curved frame 18 may include a plurality of members.

Figure 2:
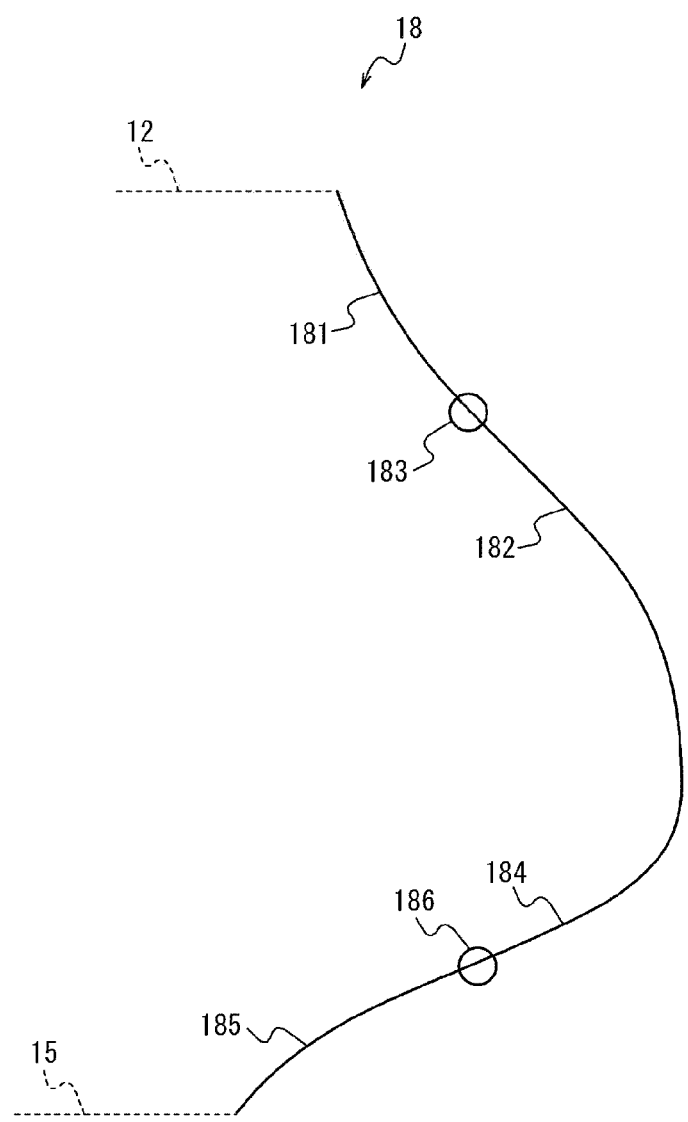
FIG. 2 is a diagram illustrating an example of an outer edge of a curved frame illustrated in FIG. 1.

FIG. 2 is a diagram illustrating an example of an outer edge of the curved frame 18, and is a diagram of the outer edge of the curved frame 18 viewed from a side surface of the flight vehicle 1.

In the example illustrated in FIG. 2, the curved frame 18 has a shape in which the outer edge is curved in a side view (as viewed from a side surface of the flight vehicle 1). Specifically, the curved frame 18 includes a first inflection point 183 at which a first curved portion 181 having one end coupled to the upper frame 12 as the first frame and curved downward (toward the base frame 15) and a second curved portion 182 curved upward (toward the upper frame 12) are coupled together. In addition, the curved frame 18 includes a second inflection point 186 at which a third curved portion 184 having one end coupled to the second curved portion 182 and curved downward and a fourth curved portion 185 coupled to the base frame 15 as the second frame and curved upward are coupled together.

Note that the configuration of the curved frame 18 is not limited to the configuration illustrated in FIG. 2. For example, as indicated by a broken line in FIG. 3, the curved frame 18 may have a configuration including an inflection point 189 at which a first curved portion 187 having one end coupled to the upper frame 12 and curved upward and a second curved portion 188 having one end coupled to the base frame 15 and curved downward are coupled together (configuration including one inflection point). As described above, the curved frame 18 according to the present embodiment has a configuration in which the outer edge is curved outward.

Figure 3:
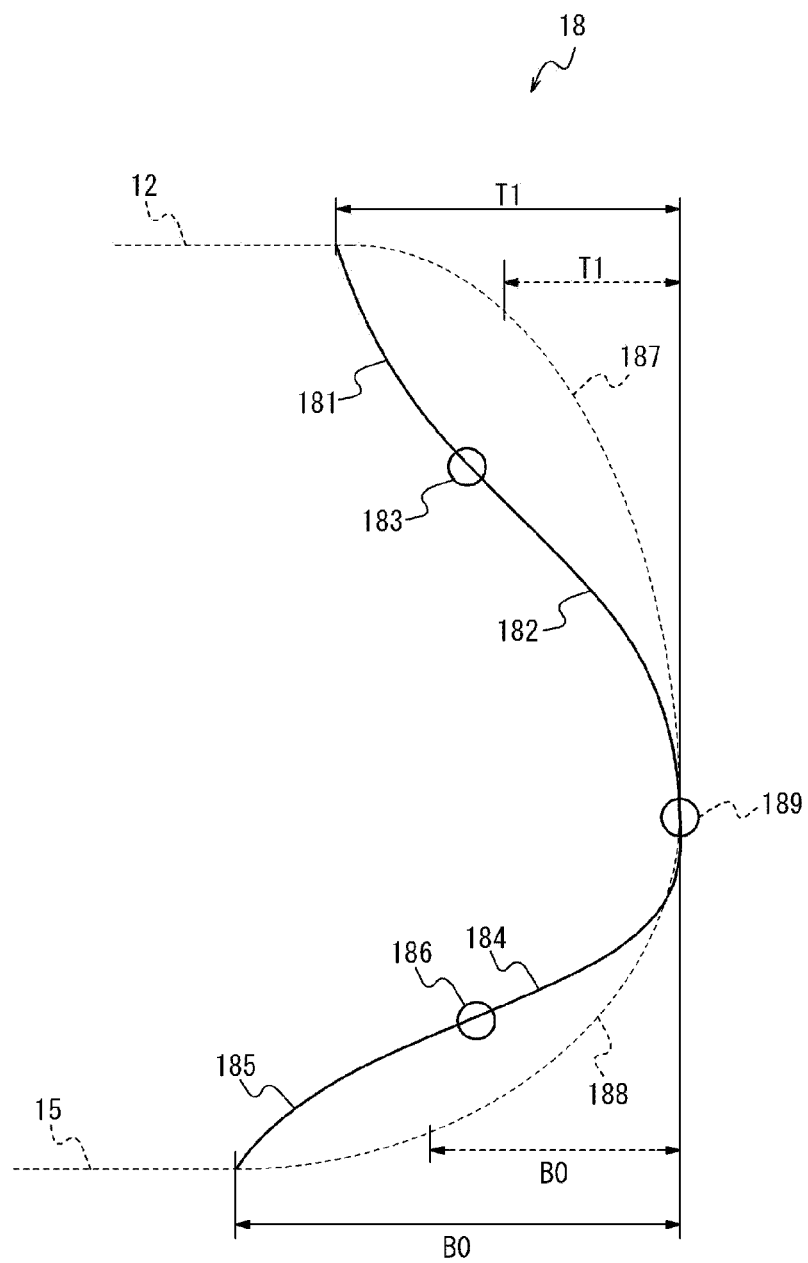
FIG. 3 is a diagram illustrating another example of the outer edge of the curved frame illustrated in FIG. 1.
Figure 4:
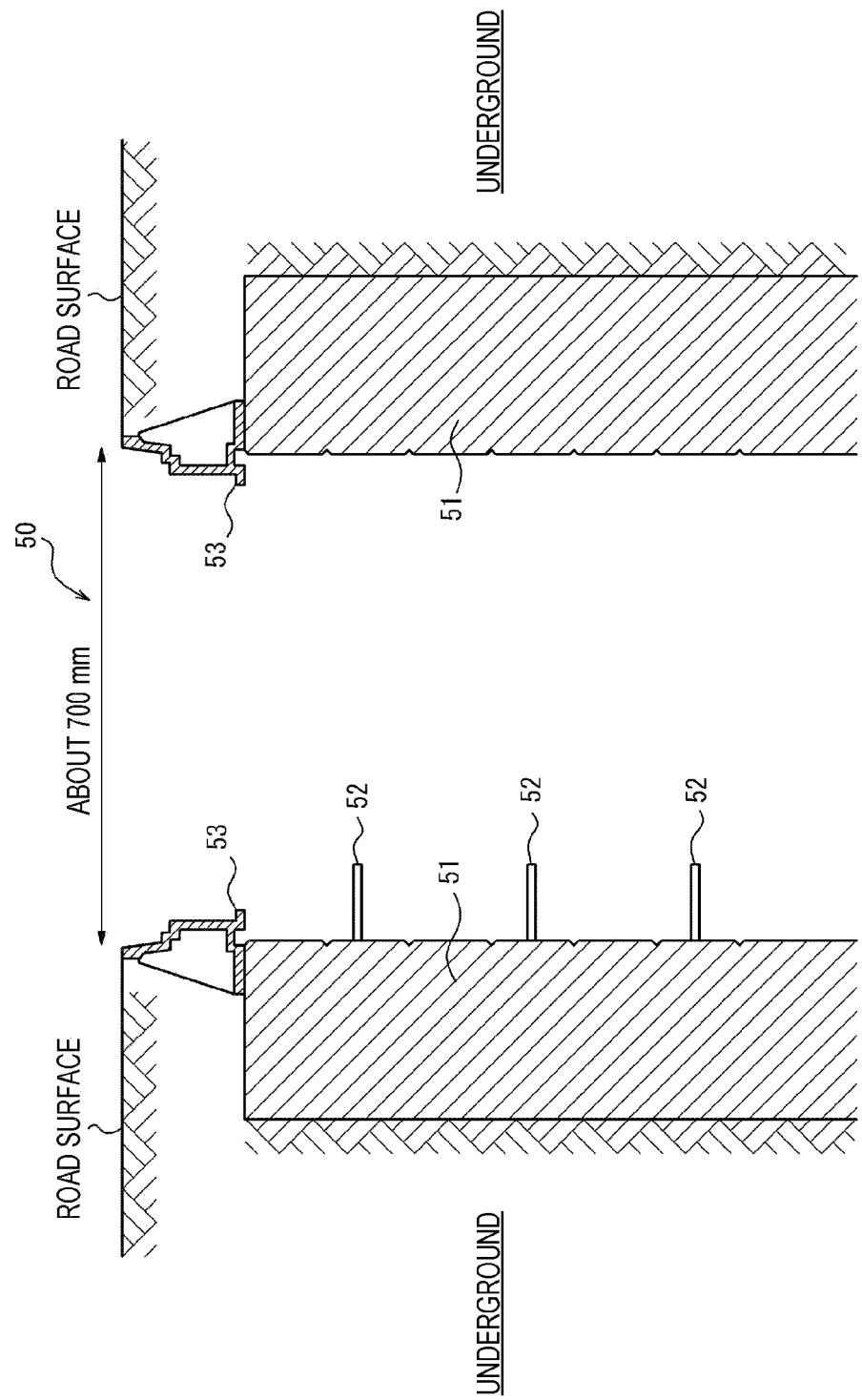
FIG. 4 is an example of a cross-sectional view of a manhole.

In the present embodiment, as illustrated in FIGS. 2 and 3, since the curved frame 18 is configured to be curved outward, it is possible to reduce a possibility that the flight vehicle 1 cannot fly, or loses its balance and falls even if contact with a protrusion in a flying space occurs. The reason will be described with reference to FIG. 3.

Figure 5A:
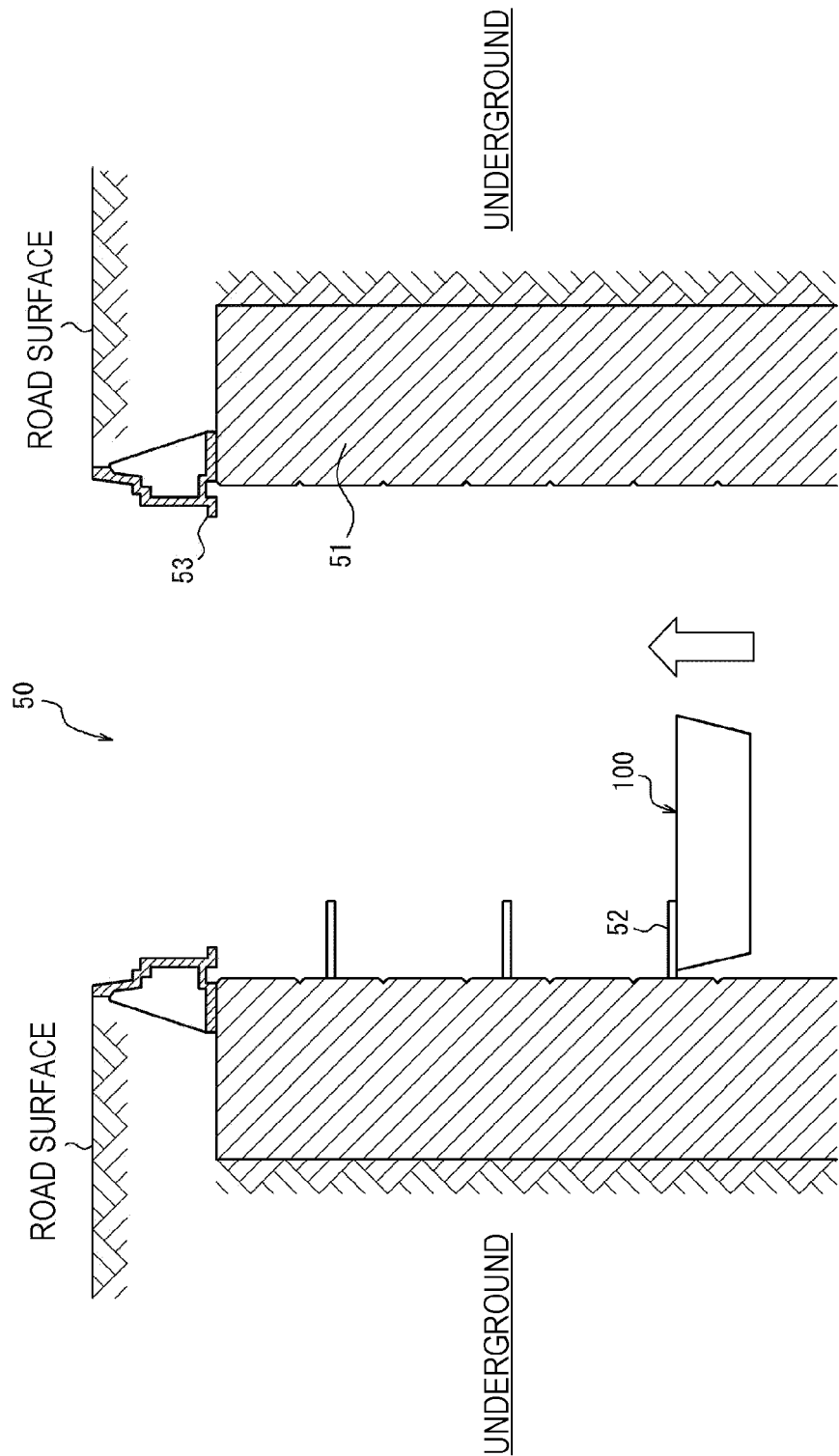
FIG. 5A is a diagram illustrating a problem of a flight vehicle including a conventional propeller guard.

As described with reference to FIGS. 5A and 5B, in a case where the flight vehicle 1 flies in a space surrounded by a wall surface, such as the structure 51 extending in the vertical direction, along the extending direction of the structure 51, the propeller guard 10 may come into contact with a protruding object protruding in a direction intersecting a flight direction of the flight vehicle 1, such as the step 52. To prevent the propeller guard 10 from being caught by the protruding object even when the propeller guard 10 comes into contact with the protruding object, it is necessary that a gradient of the outer edge of the curved frame 18 with respect to the protruding object is large to some extent. If the gradient of the outer edge of the curved frame 18 with respect to the protruding object is large to some extent, the curved frame 18 slides in the flight direction of the flight vehicle 1 even if contact with the protruding object occurs, whereby the propeller guard 10 can be prevented from being caught by the protruding object.

In a case where the curved frame 18 has a configuration including one inflection point 189 as illustrated in FIG. 3, if a distance B0 and a distance T1 indicated by broken line arrows in FIG. 3 are sufficiently long, being caught by the protruding object can be made less likely to occur. Here, the distance B0 is a distance in the horizontal direction from the outermost point of the curved frame 18 to a point on the curved frame 18 at which the propeller guard 10 can slide without being caught even when contact with the protruding object on the lower side of the flight vehicle 1 occurs in a case where the flight vehicle 1 flies downward. In addition, the distance T1 is a distance in the horizontal direction from the outermost point of the curved frame 18 to a point on the curved frame 18 at which the propeller guard 10 can slide without being caught even when contact with the protruding object on the upper side of the flight vehicle 1 occurs in a case where the flight vehicle 1 flies upward.

When the distance B0 and the distance T1 are increased, the diameter of the propeller guard 10 increases in the horizontal direction. Thus, the length in the horizontal direction can be suppressed by providing the inflection point 189 as illustrated in FIG. 3.

Further, in a case where the curved frame 18 has the configuration including the two inflection points (the first inflection point 183 and the second inflection point 186) as described with reference to FIG. 2, in the vicinity of a coupling portion between the curved frame 18 and the upper frame 12, it is possible to increase the gradient with respect to the protruding object protruding in a direction (the left-right direction in the figure) perpendicular to the flight direction (the vertical direction in the figure) of the flight vehicle 1 as compared with the curved frame 18 indicated by the broken line in FIG. 3. For that reason, in a case where the flight vehicle 1 flies upward, being caught by the protruding object is less likely to occur in the vicinity of the coupling portion between the curved frame 18 and the upper frame 12. In addition, in the vicinity of a coupling portion between the curved frame 18 and the base frame 15, it is possible to increase the gradient with respect to the protruding object protruding in a direction (the left-right direction in the figure) perpendicular to the flight direction (the vertical direction in the figure) of the flight vehicle 1 as compared with the curved frame 18 indicated by the broken line in FIG. 3. For that reason, in a case where the flight vehicle 1 flies downward, being caught by the protruding object is less likely to occur in the vicinity of the coupling portion between the curved frame 18 and the base frame 15.

As described above, according to the configuration of the curved frame 18 including the two inflection points (the first inflection point and the second inflection point) illustrated in FIG. 2, the distance T1 can be extended to the vicinity of the coupling portion between the curved frame 18 and the upper frame 12, and the distance B0 can be extended to the vicinity of the coupling portion between the curved frame 18 and the base frame 15, as illustrated by solid line arrows in FIG. 3, as compared with the configuration including one inflection point 189. For that reason, according to the configuration of the curved frame 18 including the two inflection points (the first inflection point and the second inflection point) illustrated in FIG. 2, being caught by the protruding object is further less likely to occur.

In addition, usually, the wall surface of the structure 51 includes concrete or the like. For that reason, a surface of the wall surface of the structure 51 is not smooth, and unevenness due to fine aggregate or the like exists. There is a case where the propeller guard 10 is caught by the unevenness of the wall surface of the structure 51. In this case, since the flight vehicle 1 sucks air from above the propeller 30 and discharges the air downward to float the airframe in the air, a contact point between the propeller guard 10 and the wall surface of the structure 51 serves as a fulcrum, the flight vehicle 1 rotates toward the wall surface of the structure 51, and the flight vehicle 1 may stick to the wall surface of the structure 51 and fall.

In the present embodiment, the vicinity of the coupling portion between the second curved portion 182 and the third curved portion 184 or the coupling portion between the first curved portion 187 and the second curved portion 188, which is located on the outermost side of the curved frame 18 and is likely to come into contact with the wall surface of the structure 51, can be designed to be substantially perpendicular and planar. For that reason, being caught by the wall surface of the structure 51 is less likely to occur.

The above-described embodiment has been described as a typical example, and it is apparent to those skilled in the art that many modifications and substitutions can be made within the spirit and scope of the present disclosure. Thus, it should not be understood that the present invention is limited by the above-described embodiment, and various modifications or changes can be made without departing from the scope of the claims.

REFERENCE SIGNS LIST 1, 100 flight vehicle
10 propeller guard
11 coupling frame
12 upper frame
13 intermediate frame
14 lower frame
15 base frame
18 curved frame
20 flight vehicle body
30 propeller
111 first coupling portion
112 second coupling portion
113 third coupling portion
181, 187 first curved portion
182, 188 second curved portion
183 first inflection point
184 third curved portion
185 fourth curved portion
186 second inflection point
189 inflection point
50 manhole
51 structure
52 step
53 manhole lid receiving frame

The invention claimed is:

1. A propeller guard configured to protect a propeller attached to a flight vehicle, the propeller guard comprising:
a first frame comprising an uppermost surface of the propeller guard, the uppermost surface being substantially in parallel to a rotating surface of the propeller;
a second frame comprising a lowermost surface of the propeller guard, the lowermost surface being substantially in parallel to the rotating surface of the propeller; and a coupling frame that couples the first frame and the second frame together,
    wherein the coupling frame is curved outward beyond the propeller of the flight vehicle,
    the coupling frame comprises a first curved portion, a second curved portion, a third curved portion, and a fourth curved portion, respectively placed on an outermost surface of the coupling frame,
    an upper end of the first curved portion attaches to an end of the first frame,
    a lower end of the first curved portion attaches to an upper end of the second curved portion,
    a lower end of the second curved portion attaches to an upper end of the third curved portion substantially along the rotating surface of the propeller,
    a lower end of the third curved portion attaches to an upper end of the fourth curved portion,
    a lower end of the fourth curved portion attaches to an end of the second frame, and
    the coupling frame further comprises, in a side view:
        a first inflection point at which an outermost surface of the lower end of the first curved portion and an outermost surface of the upper end of the second curved portion are coupled together,
        the first curved portion is curved inward,
        the second curved portion is curved outward,
        a second inflection point at which an outermost surface of the lower end of the third curved portion and an outermost surface of the upper end of the fourth curved portion are coupled together,
        the third curved portion is curved outward, and
        the fourth curved portion is curved inward.

2. The propeller guard according to claim 1, wherein the propeller guard is configured to prevent the propeller from being caught on a protruding object from a wall surface while the flight vehicle moves in a space surrounded by the wall surface.

3. The propeller guard according to claim 2, wherein the first curved portion is configured to cause the flight vehicle to slide along the protruding object as the flight vehicle moves upward in the space surrounded by the wall surface.

4. The propeller guard according to claim 2, wherein the fourth curved portion is configured to cause the flight vehicle to slide along the protruding object as the flight vehicle moves downward in the space surrounded by the wall surface.

5. The propeller guard according to claim 2, wherein the coupling frame includes a plurality of curved frames.

6. The propeller guard according to claim 2, wherein the space surrounded by the wall surface comprises an underground section.

7. A flight vehicle, comprising:
a propeller guard for protecting a propeller attached to the flight vehicle, and the propeller guard comprising:
a first frame comprising an uppermost surface of the propeller guard, the uppermost surface being substantially in parallel to a rotating surface of the propeller;
a second frame comprising a lowermost surface of the propeller guard, the lowermost surface being substantially in parallel to the rotating surface of the propeller; and
a coupling frame that couples the first frame and the second frame together,
    wherein the coupling frame is curved outward beyond the propeller of the flight vehicle,
    the coupling frame comprises a first curved portion, a second curved portion, a third curved portion, and a fourth curved portion, respectively placed on an outermost surface of the coupling frame,
    an upper end of the first curved portion attaches to an end of the first frame,
    a lower end of the first curved portion attaches to an upper end of the second curved portion,
    a lower end of the second curved portion attaches to an upper end of the third curved portion substantially along the rotating surface of the propeller,
    a lower end of the third curved portion attaches to an upper end of the fourth curved portion,
    a lower end of the fourth curved portion attaches to an end of the second frame, and
    the coupling frame further comprises, in a side view:
        a first inflection point at which an outermost surface of the lower end of the first curved portion and an outermost surface of the upper end of the second curved portion are coupled together,
        the first curved portion is curved inward,
        the second curved portion is curved outward,
        a second inflection point at which an outermost surface of the lower end of the third curved portion and an outermost surface of the upper end of the fourth curved portion are coupled together,
        the third curved portion is curved outward, and
        the fourth curved portion is curved inward.

8. The flight vehicle according to claim 7, wherein the propeller guard is configured to prevent the propeller from being caught on a protruding object from a wall surface while the flight vehicle moves in a space surrounded by the wall surface.

9. The flight vehicle according to claim 8, wherein the first curved portion is configured to cause the flight vehicle to slide along the protruding object as the flight vehicle moves upward in the space surrounded by the wall surface.

10. The flight vehicle according to claim 8, wherein the fourth curved portion is configured to cause the flight vehicle to slide along the protruding object as the flight vehicle moves downward in the space surrounded by the wall surface.

11. The flight vehicle according to claim 8, wherein the coupling frame includes a plurality of curved frames.

12. The propeller guard according to claim 8, wherein the space surrounded by the wall surface comprises an underground section.

* * * * *